US012319079B1

(12) United States Patent
Belevski et al.

(10) Patent No.: US 12,319,079 B1
(45) Date of Patent: Jun. 3, 2025

(54) DYNAMIC MISMATCH CORRECTION SYSTEM AND METHOD FOR BOOK BINDING MACHINES

(71) Applicant: LIGHTNING SOURCE LLC, LaVergne, TN (US)

(72) Inventors: Zoran Belevski, LaVergne, TN (US); Joshua Sanders, LaVergne, TN (US); Danny Howell, LaVergne, TN (US); John Kwiatkowski, LaVergne, TN (US); Kenneth McDonald, LaVergne, TN (US); Joel Brawner, LaVergne, TN (US); Kevin Smith, LaVergne, TN (US)

(73) Assignee: Lightning Source LLC, LaVergne, TN (US)

( * ) Notice: Subject to any disclaimer, the term of this patent is extended or adjusted under 35 U.S.C. 154(b) by 0 days.

(21) Appl. No.: 18/670,091

(22) Filed: May 21, 2024

(51) Int. Cl.
*B42C 11/02* (2006.01)
*B42C 11/04* (2006.01)
*B42C 19/08* (2006.01)

(52) U.S. Cl.
CPC .............. *B42C 19/08* (2013.01); *B42C 11/02* (2013.01); *B42C 11/04* (2013.01)

(58) Field of Classification Search
CPC ................................ B42C 11/02; B42C 11/04
(Continued)

(56) References Cited

U.S. PATENT DOCUMENTS

| | | | |
|---|---|---|---|
| 5,174,454 | A | 12/1992 | Parkander |
| 5,178,506 | A | 1/1993 | Meschi |

(Continued)

FOREIGN PATENT DOCUMENTS

| | | | |
|---|---|---|---|
| CA | 2974039 | A1 | 7/2016 |
| EP | 2269823 | A1 | 1/2011 |

(Continued)

OTHER PUBLICATIONS

EP-4202632-A1 English Translation (Year: 2023).*
PCT Search Report for corresponding patent application No. PCT/US2024/030315, Feb. 14, 2025, 10 pages.

*Primary Examiner* — Kyle R Grabowski
(74) *Attorney, Agent, or Firm* — Patterson Intellectual Property Law, PC

(57) ABSTRACT

Systems and methods are provided for automatically correcting book portion mismatches in a book binding operation. First sensor outputs relate to a first book portion sequence along a first assembly channel, and second book portion sequence along a second assembly channel, each leading into a book binding stage. A mismatch state between first and second book portions is predicted based on the respective sequences and a defined book assembly batch, responsive to which an intervention event is selected and executed. One such intervention event includes selective routing of the first and/or second book portion associated with predicted mismatch states into a correction channel and reinsertion of the first and/or second book portion into the respective assembly channel corresponding to a modified version of the respective sequence. In some embodiments, a further sensor may be provided at the book binding stage entry for further confirmation/control feedback regarding matched book portions.

12 Claims, 2 Drawing Sheets

(58) Field of Classification Search
USPC ........................................................ 412/11–12
See application file for complete search history.

(56) References Cited

U.S. PATENT DOCUMENTS

| | | | | |
|---|---|---|---|---|
| 5,857,830 | A | 1/1999 | Harres et al. | |
| 6,193,458 | B1 | 2/2001 | Marsh | |
| 7,441,762 | B2 | 10/2008 | Kearns | |
| 8,425,389 | B2 | 4/2013 | Dobrovolsky | |
| 9,067,453 | B2 | 6/2015 | Wiegand et al. | |
| 9,959,017 | B2 | 5/2018 | Mindrum | |
| 10,246,277 | B1 | 4/2019 | Kubiak et al. | |
| 10,421,627 | B2 | 9/2019 | Kubiak et al. | |
| 10,449,796 | B2 | 10/2019 | Dobrovolsky | |
| 2006/0028662 | A1 | 2/2006 | Dobrovolsky | |
| 2007/0036637 | A1 | 2/2007 | Hata et al. | |
| 2008/0138170 | A1 | 6/2008 | Sturnick et al. | |
| 2008/0273945 | A1 | 11/2008 | Levine et al. | |
| 2009/0274536 | A1 | 11/2009 | Silberbauer | |
| 2010/0158639 | A1 | 6/2010 | Manico et al. | |
| 2012/0155701 | A1 | 6/2012 | Levine et al. | |
| 2020/0193337 | A1 * | 6/2020 | Teranishi ................ | H04W 4/02 |
| 2021/0008918 | A1 | 1/2021 | Herrmann | |

FOREIGN PATENT DOCUMENTS

| | | | | |
|---|---|---|---|---|
| EP | 4202632 | A1 * | 6/2023 | ............... B42D 1/00 |
| WO | 2011108935 | A1 | 9/2011 | |

* cited by examiner

DYNAMIC MISMATCH CORRECTION SYSTEM AND METHOD FOR BOOK BINDING MACHINES

FIELD OF THE DISCLOSURE

The present disclosure relates generally to the field of processing printed materials, and, more particularly, to a dynamic rejection system for use with a book binding machine.

BACKGROUND

Processing printed materials, namely the manufacture of books, is generally conducted via a production line. The process begins with printing text or other content onto a web or roll of paper material via a printing station. The roll of paper is then transferred to a cutting station where it is cut into individual sheets or pages. The individual sheets are then folded at a folding station before being transferred to a collection station. At the collection station, the folded individual sheets are collected and combined into a book block. The book block is transferred to a binding station where each of the individual folded sheets of the book block are bound together and a cover is attached, thus creating a bound book. The bound book is then transferred to a trimming station where the bound book may be trimmed to size as needed.

It may be desirable to use a common production line to manufacture a variety of different books. However, the use of a common production line may result in several issues, with one exemplary issue being binding together a mismatching book block and case cover. This error may be compounded for parallel arrays of book blocks and case covers involving many different books rather than large batch orders of the same book.

Thus, it may be desirable to automatically detect and intervene when mismatching materials are set to be fed into the binding device. Often, the only way an issue may be detected is via an operator visually observing the infeed into the binding device. When the operator detects the mismatch, they may halt the production line and remedy the mismatch before the mismatched materials are fed into the binding machine. This typically results in substantial losses of productivity and efficiency. Moreover, this system presents ergonomic issues as it requires a human operator to continuously monitor the materials being fed into the binding device.

Accordingly, a need exists for improvements in the manufacture of books, and specifically in detecting mismatched materials before the materials are fed into a binding device of a book production line.

BRIEF SUMMARY

This summary is provided to introduce a selection of concepts in a simplified form with respect to those further described below. This summary is not intended to identify key features or essential features of an invention as disclosed herein, or to otherwise limit the scope of an invention as disclosed herein, unless otherwise specifically noted.

In one embodiment, a method as disclosed herein for automatically correcting book portion mismatches in a book binding operation may include receiving one or more input signals from at least a first sensor corresponding to a sequence of first book portions being conveyed along a first assembly channel leading into a book binding stage, and receiving one or more input signals from at least a second sensor corresponding to a sequence of second book portions being conveyed along a second assembly channel leading into the book binding stage. A mismatch state is predicted between a first book portion and a second book portion based on the respective sequences and with respect to expected first and second sequences dependent on a defined book assembly batch, and an intervention state corresponding to the predicted mismatch state is automatically executed. The correction event may be selected from among a plurality of intervention events, at least one of the plurality of selectable intervention events comprising a selective routing of the first book portion and/or the second book portion associated with the predicted mismatch state from the respective assembly channel into a correction channel and reinsertion of the first book portion and/or the second book portion associated with the predicted mismatch state into the respective assembly channel corresponding to a modified version of the respective sequence.

In one exemplary and optional further aspect according to the above-referenced embodiment of a method, at least another one of the plurality of selectable intervention events may comprise a selective removal of the first book portion and/or the second book portion associated with the predicted mismatch state from the respective assembly channel.

In another exemplary and optional further aspect according to the above-referenced embodiment of a method, the selectable intervention events may be performed without interrupting the book binding stage.

In another exemplary and optional further aspect according to the above-referenced embodiment of a method, a model development stage may include, for each of a plurality of input data sets received over time and comprising inputs from the first sensor and associated inputs from the second sensor, correlating the input data sets, and any predicted mismatches and/or performed intervention events, with determined outcomes at a corresponding book binding stage. For a current book binding operation, the method may accordingly include predicting the mismatch state between the first book portion and the second book portion, and further determining the intervention event corresponding to the predicted mismatch state, based on the associated inputs from the first sensor and the second sensor and by reference to correlated data sets from the model development stage.

In another exemplary and optional further aspect according to the above-referenced embodiment of a method, as part of the respective input data sets for the model development stage and for the current book binding operation, one or more input signals may be received from at least a third sensor corresponding to matched first and second book portions at an end of the first and second assembly channels and leading into the book binding stage. A further intervention event, or lack thereof, may be performed based on confirmation or a determined mismatch of the matched first and second book portions via the input signals from the at least third sensor.

In another exemplary and optional further aspect according to the above-referenced embodiment of a method, the further intervention event, or lack thereof, may be performed based on the confirmation or the determined mismatch of the matched first and second book portions via the input signals from the at least third sensor is provided as a determined outcome with respect to the model development stage.

In another exemplary and optional further aspect according to the above-referenced embodiment of a method, the determined outcomes at least with respect to any predicted mismatch state may comprise a determined productivity impact of a corresponding intervention event.

In another exemplary and optional further aspect according to the above-referenced embodiment of a method, the predicted mismatch state may comprise a predicted mismatch differential, and the method may comprise determining an intervention event or lack thereof based at least in part on a comparison of the predicted mismatch differential to a threshold value.

In another exemplary and optional further aspect according to the above-referenced embodiment of a method, the threshold value may be determined at least in part by reference to correlated data sets from the model.

In another embodiment as disclosed herein, a system for automatically correcting book portion mismatches in a book binding operation may include at least a first sensor configured to generate output signals corresponding to a sequence of first book portions being conveyed along a first assembly channel leading into a book binding stage, at least a second sensor configured to generate output signals corresponding to a sequence of second book portions being conveyed along a second assembly channel leading into the book binding stage, and a controller functionally linked to the at least first sensor and the at least second sensor. The controller, alone or in some embodiments further in association with one or more processors independent of the controller, may be configured to direct the performance of steps in a method according to the above-referenced embodiment and optionally one or more of the aspects thereof.

In another embodiment, a controller according to the previously described embodiment may be replaced or supplemented with further processing units, local to the book binding machine at issue or remotely located and functionally linked thereto, such as for example implementing cloud computing applications, mobile user computing devices, or the like.

Numerous objects, features and advantages of a system and method as disclosed herein will be readily apparent to those skilled in the art upon a review of the following description in conjunction with the accompanying drawings.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, e.g., Bryan A. Garner, A Dictionary of Modern Legal Usage 624 (2d. Ed. 1995).

Figure 1:
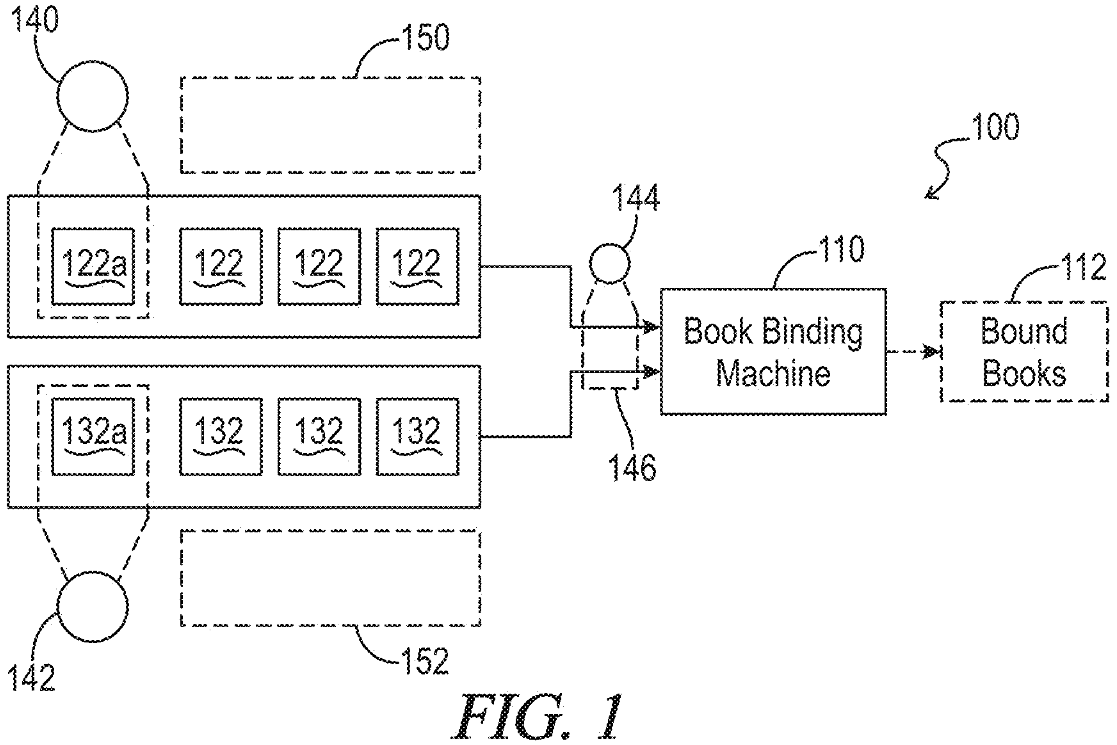
FIG. 1 is a block diagram representing an exemplary embodiment of a system, or portions thereof, for automatically correcting book portion mismatches in a book binding operation according to the present disclosure.

Referring now to the figures, and specifically FIG. 1, a dynamic rejection system is schematically illustrated and generally designated by the number 100. The dynamic rejection system 100 as disclosed herein may be provided with respect to a book production line located in an industrial plant. The book production line may also be referred to herein generally as an industrial process. The book production line may be operable to produce bound books 112 via the manipulation of raw materials as further described herein. While the dynamic rejection system 100 may be referred to in association with the book production line, in other optional embodiments, the dynamic rejection system 100 may exist independent of the book production line.

Various sensors, controllers, online devices, and other intermediate components may be "Internet-of-things" (IoT) compatible, or otherwise comprise an interrelated network, wherein relevant outputs may be uploaded to a cloud-based server in real time. In some cases, the dynamic rejection system 100 may be linked to communicate with an industrial plant's local control system to improve overall efficiency of the book production line.

Accordingly, systems and methods as disclosed herein may be implemented to allow for the continuous operation of at least a portion of the book production line. By monitoring and/or indirectly determining variables, feedback loops can be used, e.g., in machine learning mode to automatically reject mismatched materials to correct quality issues prior to binding a book.

The dynamic rejection system 100 may include a book block assembly line 120 (also referred to herein as a primary book block assembly channel 120) operable to assemble and output book blocks 122 and a case cover assembly line 130 (also referred to herein as a primary case cover assembly channel 130) operable to assemble and output case covers 132. The book block assembly line 120 and case cover assembly line 130 may form a portion of and/or be associated with the book production line, wherein a bound book 112 may be assembled by binding a book block 122 to a corresponding case cover 124. The book block assembly line 120 and the case cover assembly line 130 may feed book blocks 122 and case covers 132, respectively, into a book binding machine 110. The book binding machine 110 may be operable to bind a book block 122 to a case cover 132, thus creating a bound book.

It may accordingly be desirable for the book block assembly line 120 and the case cover assembly line 130 to be synchronized. Book blocks 122 output by the book block assembly line 120 may preferably correspond to case covers

132 output by the case cover assembly line 130. Thus, each book block 122 may feed into the book binding machine 110 with a corresponding (e.g., matching) case cover 132. For example, the book block assembly line 120 may sequentially feed book blocks of respective blook block types 122A, 122B, 122C, and 122D into the book binding machine 110 while the case cover assembly line 130 may sequentially feed case covers of respective case cover types 132A, 132B, 132C, and 132D into the book binding machine 110. Book block 122A may correspond to case cover 132A, book block 122B may correspond to case cover 132B, book block 122C may correspond to case cover 132C, and book block 122D may correspond to case cover 132D. Thus, the book binding machine 110 may receive four matching pairs of book blocks and case covers, those matching pairs being 122A-132A, 122B-132B, 122C-132C, and 122D-132D.

In certain exemplary scenarios, the book block assembly line 120 and case cover assembly line 130 may feed a mismatched pair into the book binding machine 110. Thus, the book binding machine 110 may accordingly bind and output a mismatched bound book 112, in the absence of an effective intervention or other action plan in the context of the present disclosure. In other exemplary scenarios, the book block assembly line 120 and case cover assembly line 130 may feed a book block 122 and case cover 132 into the book binding machine 110 that are matching, but the book block 122 and/or case cover 132 may include a defect. Thus, the book binding machine 110 may bind and output a defective bound book 112, in the absence of an effective intervention or other action plan in the context of the present disclosure. It is desirable to prevent exemplary scenarios such as these.

Accordingly, various embodiments of a system 100 as disclosed herein may further include a secondary book block assembly line, or book block correction channel 150, for example in parallel with the primary book block assembly line 140 or otherwise enabling selective diverting of one or more book blocks 122 from the primary book block assembly line 140 and optionally later back into the primary book block assembly line 140. Embodiments of a system 100 as disclosed herein may further, or alternatively, include a secondary case cover assembly line, or case cover correction channel 152, for example in parallel with the primary case cover assembly line 130 or otherwise enabling selective diverting of one or more case covers 132 from the primary case cover assembly line 130 and optionally later back into the primary case cover assembly line 130.

In various embodiments, each book block and case cover may include a unique identifier (UID) associated therewith. The unique identifier may be a Universal Product Code (UPC), International Article Number (EAN), Quick Response (QR) code, or a numerical identifier to name a few examples. Each UID may be printed on, stamped on, or formed in a surface of the book block and case cover. The surface the UID appears on may be a surface visible when the book block and/or case cover is moving through the book production line, such as a top surface. While the UID is one exemplary process element, other process elements may be within the spirit and scope of the present disclosure. In some embodiments, an identifier may be defined with reference to a type of book, wherein for example any one of a number of book blocks of a first type may be satisfactorily bound with any one of a number of case covers of a first type. A type of book block or case cover in this context may for example refer to content, graphical designs, shape, size, or the like. In other embodiments, an identifier may be unique to one specific book block to desirably be bound with respect to one specific case cover.

The dynamic rejection system 100 may be configured to enable a substantially continuous operation of the book production line, and specifically for example the book block assembly line 120, case cover assembly line 130, and/or book binding machine 110. The dynamic rejection system 100 may be configured to detect certain process elements associated with the book production line and selectively respond thereto.

Although not shown in FIG. 1, the dynamic rejection system 100 may include a book block quality detection system, for example located after the book block assembly line 120 and operable to receive book blocks 122 output by the book block assembly line 120. The book block quality detection system may be operable to detect quality errors present in the book blocks 122, such as misprints, incorrect sheet order, or sheet misalignment to name a few examples. In certain optional embodiments, the book block quality detection system may be automatically implemented by a machine. When the book block quality detection system detects an error present in a book block 122, the system may automatically divert the book block 122 from the primary book block assembly line 120.

The dynamic rejection system 100 may, additionally or alternatively with respect to the book block quality detection system, include a case cover quality detection system, for example located after the case cover assembly line 130 and operable to receive the case covers 132 that are output by the case cover assembly line 130. The case cover quality detection system may be operable to detect quality errors present in case covers 132, such as misprints to name an example. In certain optional embodiments, the case cover quality detection system may be automatically implemented by a machine. When the case cover quality detection system detects an error present in a case cover 132, the system may automatically divert the case cover 132 from the primary case cover assembly line 130.

Figure 2:
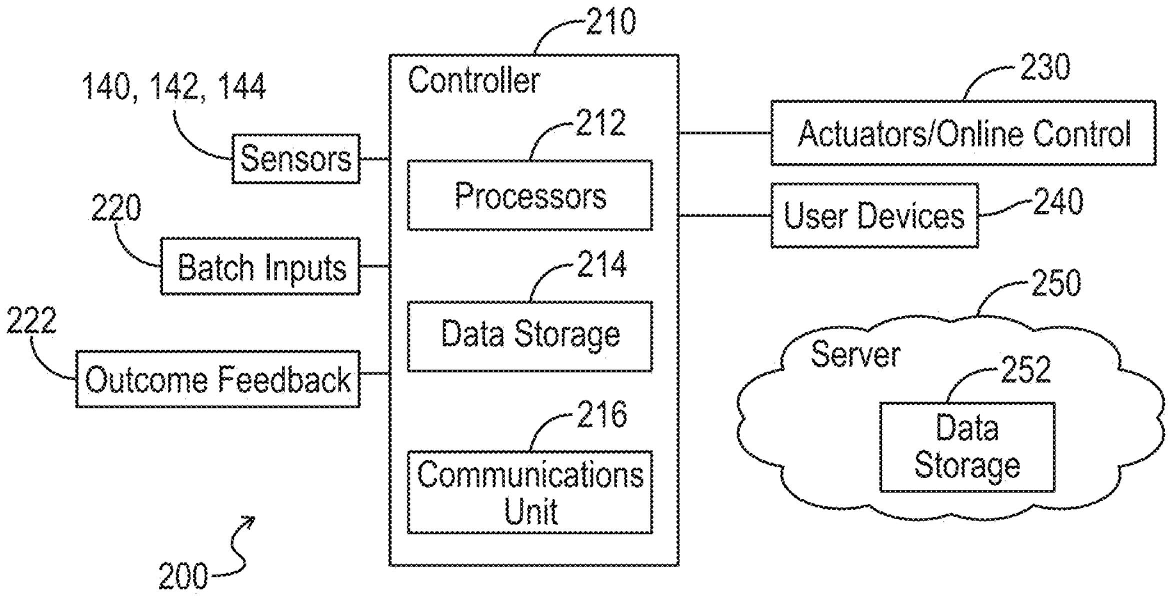
FIG. 2 is a block diagram representing an exemplary embodiment of a data processing and/or control system, or portions thereof, according to the present disclosure.

In an embodiment as represented in FIG. 2, the dynamic rejection system 100 may include a control system 200. The control system 200 may include a controller 210, such as a programmable logic controller (PLC) to name an example, for implementation of some or all automated functions associated with the various embodiments of systems and methods as disclosed herein or as may be readily understood by one of skill in the art to be preferably implemented in association therewith.

The controller 210 may be part of a book binding machine control system of a book binding machine 110, or it may be a separate control module. The controller 210 may be configured to receive input signals from one or more sensors defining a sensor system 140, 142, 144 as further described herein. Various of the sensors 140, 142, 144 may typically be discrete in nature, but in some embodiments signals representative of more than one input parameter may be provided from the same sensor, and a sensor system 140, 142, 144 as disclosed herein may further include or otherwise refer to signals provided from the controller 210, an electronic control unit, a book binding machine control system, or the like.

The dynamic rejection system 100 may be associated with a cloud-based server 250 further functionally linked to the controller 210, and/or at least one user computing device 240 having a display unit for implementing a graphical user interface as further described herein. In alternative embodiments, it may be that the dynamic rejection system 100 is fully locally implemented with respect to book production line, wherein the cloud-based aspects are omitted. The user computing device 240 may, in further alternative embodiments, be functionally linked to the book production line via a communications network and configured to act as the server 250 for the purpose of data collection and processing as disclosed herein.

In an embodiment, the local controller 210 may be functionally linked to the server 250 via a communications network and configured, for example, to direct the collection and transmittal of data from the book production line to the server 250, and further to direct output signals from the server to other process controllers at the book production line level or more directly to process actuators 230 in the form of control signals to implement automated interventions. For example, control signals may comprise signals to one or more actuators 230 for enabling or disabling portions of the book binding process, selectively diverting, reinstating, or removing mismatched elements, or the like.

In some embodiments the controller 210 may be omitted, where for example data collection tools are distributed to directly transmit data streams via the communications network, and the user computing device 240 is implemented to receive the output signals from the server 250, etc. In some optional embodiments, the controller 210 may be comprised of at least part of a book production line's resident control system. The term "controller" is used herein to refer to a local controller or more generally to a processing and control stage which may include the server 250, but it is noted that unless otherwise stated for a given embodiment the process control functions may be implemented via a local or external computing device/network without limitation.

A data collection stage may be associated with the dynamic rejection system 100 to provide real time sensing for various process elements, such as at least the book block assembly line 120 and case cover assembly line 130 referred to above. Various process elements as referenced in FIG. 1 with respect to the book production line may be determined by the dynamic rejection system 100. Real-time process elements, such as the UID for example, for one or more book blocks and/or one or more case covers may be directly sensed or detected by the system host, or at least the system 100 may be configured to collect or otherwise obtain such data.

One or more online sensors 140, 142, 144 may, for example, be configured to provide substantially continuous and wireless signals representative of values or states of certain process elements associated with the book production line. The term "online" as used herein may generally refer to the use of a device, sensor, or corresponding sensing elements proximally located to associated process elements, and generating output signals in real time corresponding to the desired process elements, as distinguished from visual or otherwise manual observation by one or more operators. The one or more online sensors 140, 142, 144 may include sensors operable to detect the UID of a book block 122 and/or case cover 132. Various ones of the sensors may for example take the form an optical sensor with a pen-type reader, an optical sensor with a laser scanner, an optical sensor with a charge-couple reader, an optical sensor with a camera-based reader, or the like. The sensors may output data and/or control signals representing the UID of an associated book block 122 and/or case cover 132.

The controller 210 may be functionally linked to further systems or devices to provide batch input data 220, for example corresponding to an expected array of book covers 122 and/or case covers 132 along the respective assembly lines 120, 130, and outcome feedback data 222, for example relating to actual matches or mismatches, and usable to iteratively train models as disclosed herein correlating input data sets to such outcomes. In various embodiments, the batch input data 220 and/or outcome feedback data 222 may be provided from user devices 240, servers 250, additional sensors, or the like.

In certain optional embodiments, the remote server 250 may further include or be communicatively linked to a proprietary cloud-based data storage 252. The data storage may for example be configured to obtain, process and aggregate/store data for the purpose of developing correlations over time, improving upon existing linear regressions or other relevant iterative algorithms, etc.

The controller 210 may for example include or be associated with one or more processors 212, a computer readable storage medium 214, a communication unit 216, and the like. The controller 210 may be configured to produce outputs to or receive inputs from, as further described below, an input/output module or an equivalent such as a control panel having a display. An input/output device, such as a keyboard, joystick, or other user interface, may be provided so that a human operator may input instructions to the controller 210. As otherwise noted herein, the controller 210 may be configured additionally or in the alternative to produce outputs to a display unit independent of the input/output module such as for example on a mobile user device 240 associated with the operator, a display unit functionally linked to one or more remote servers 250, one or more other book binding machines, etc. The controller 210 may in some embodiments further receive inputs from the remote user devices, servers, and/or other book binding machines via respective user interfaces, for example a display unit with touchscreen interface.

It may be understood that the controller 210 described herein may be a single controller having all of the described functionality, such as for example being part of a central book binding machine control unit, or it may include multiple controllers wherein the described functionality is distributed among the multiple controllers.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Various operations, steps or algorithms as described in connection with the controller 210 can be embodied directly in hardware, in a computer program product such as a software module executed by the processor 212, or in a combination of the two. The computer program product can reside in RAM memory, flash memory, ROM memory, EPROM memory, EEPROM memory, registers, hard disk, a removable disk, or any other form of computer-readable medium 214 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The communication unit 216 may support or provide communications between the controller 210 and external systems or devices, and/or support or provide communication interface with respect to internal components of the system 100. The communication unit 216 may for example include a transceiver operable to send and receive respective output and input signals, and which may permit communications across a communication medium using known communications protocols or proprietary communication protocols. For example, the transceiver may permit the use of Ethernet, Bluetooth, Wi-Fi, a wireless application protocol, an IEEE 802 standard, or any other communications protocol, configuration, or implementation. The communications unit 216 may include wireless communication system components (e.g., via cellular modem, WiFi, Bluetooth, or the like) and/or may include one or more wired communications terminals such as universal serial bus ports.

Figure 3:
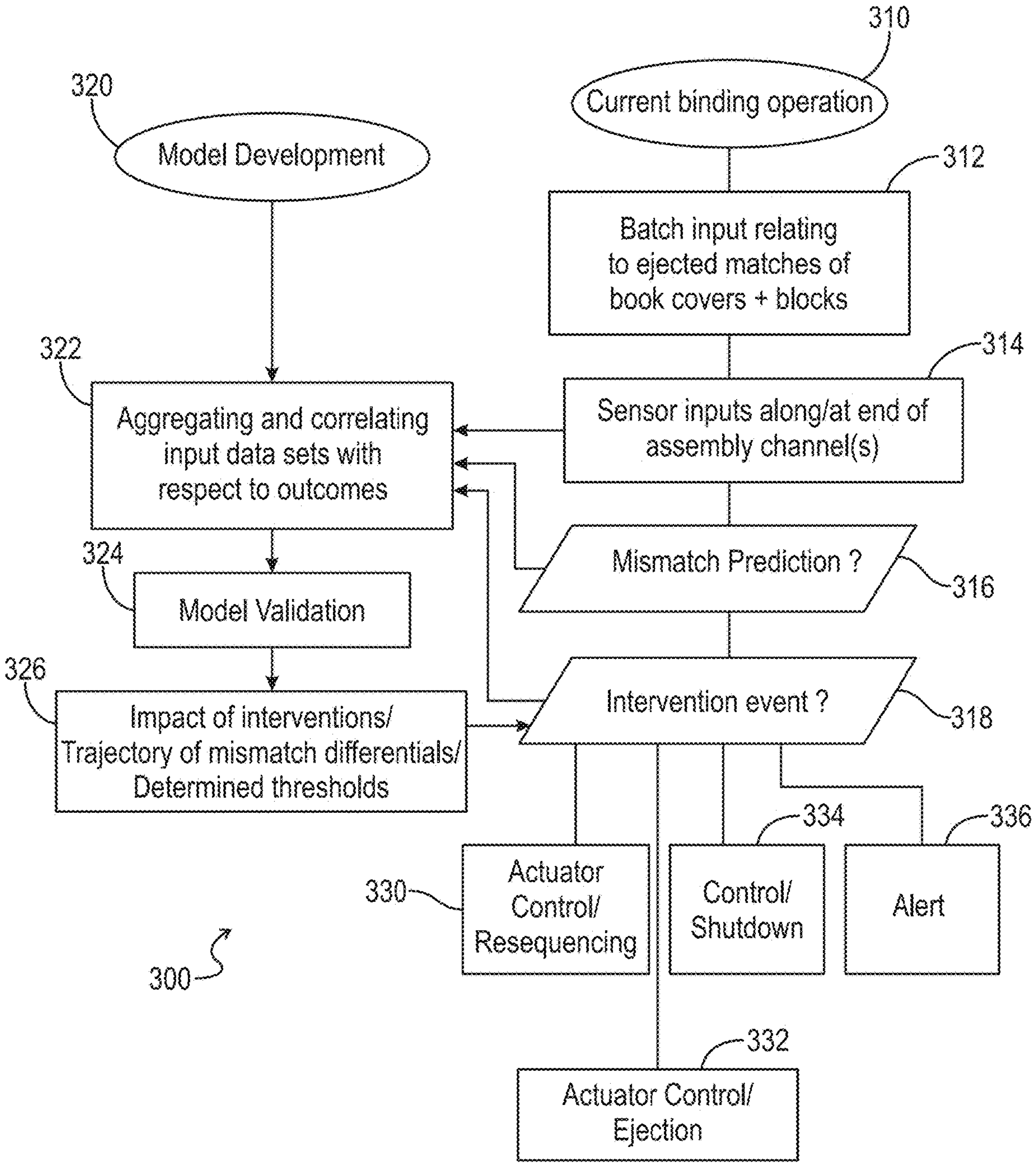
FIG. 3 is a block diagram representing an exemplary embodiment of a method, or portions thereof, for automatically correcting book portion mismatches in a book binding operation according to the present disclosure.

With further reference now to FIG. 3, the depicted flowchart represents an exemplary embodiment of a method 300 which may for example be executed at least in part by the control system 200 to enable automated control of the dynamic rejection system 100. For illustrative purposes, but not limiting on the scope of the systems and methods disclosed herein unless otherwise specifically noted, FIG. 3 will accordingly be described in the context of the systems and associated devices and apparatus of FIGS. 1 and 2. While the illustrated embodiment of a method 300 may include a specific arrangement of steps, inputs, outputs, and the like, it may be understood that certain steps may be combined, performed in a different order, or even omitted altogether in other embodiments within the scope of the present disclosure, unless otherwise specifically noted herein.

In various embodiments of a current binding operation 310 as disclosed herein, input signals may be received from one or more online sensors located along and/or at the end of the respective assembly channels (step 314). As noted herein, the input signals may take the form of captured images, scanned barcodes or QR codes, or the like as being representative of a unique book element or a type of book element. In some embodiments, the current binding operation 310 may include the receiving of batch input relating to expected matches of book blocks and corresponding covers in a book binding process, for example previously or concurrently with respect to the input signals (step 312). Such batch inputs may for example be downloaded to the system from an external source or manually entered via a user interface. In other embodiments, batch input may be generated substantially in real time during the operation, based for example on initial sets of the input signals on a first end of the respective assembly channels.

The controller and/or other processors associated with the system may analyze the current state of the respective assembly channels and compare against the expected array of book blocks and case covers to predict any mismatches at the output to the book binding machine (step 316). If a mismatch is predicted, the method may continue in step 318 by deciding whether an intervention event is warranted, and what type of such intervention, based in part on the trajectory of mismatch differential, a specified threshold (if any), an impact of the preferred intervention on the ongoing book binding process, etc. In various exemplary embodiments, intervention events may be identified via threshold-based analysis of an indirectly determined (or predicted) process element. Specifically, the dynamic rejection system 100 may predict a mismatch differential associated with the book production line based at least on the outputs from a data collection stage (i.e., sensors, user input, etc.). The dynamic rejection system 100 may determine whether a control intervention is required based at least in part on a comparison of the predicted mismatch differential to a mismatch differential threshold value. The dynamic rejection system 100 may detect an intervention event when at least one mismatched pair is detected and/or predicted.

In the illustrated embodiment, the current binding operation 310 may utilize one or more models developed and iteratively trained over time with respect to a preceding (and typically ongoing) model development stage 320, to correlate input data sets 314 such as those provided during the current binding operation 310 with outcomes further associated with possible intervention events. Various types of machine learning models and corresponding algorithms may conceivably be implemented with embodiments of a system and method as disclosed herein, but it may be generally understood that input data sets from the online sensors may preferably be received and aggregated across a large number of binding operations, and further in some embodiments (depending in part on the ability of the system in previous iterations to perform such tasks) combined with corresponding mismatch predictions, intervention events, and the like (step 322).

Models according to the present disclosure may for example be trained and further validated (step 324) using "test" datasets from historical inputs (e.g., signals from online sensors, corresponding mismatch predictions and/or intervention events), and the trained and validated models may further be utilized for mismatch prediction and/or determination of an intervention event based on "current" datasets. The current datasets may further be utilized as feedback and accordingly a test dataset for further training and/or validation of the existing models. In some embodiments, model validation may include determining the impact of previous interventions, a relative trajectory of mismatch differentials, determined mismatch thresholds for deciding whether to perform a resequencing intervention as opposed to shut down, and the like (step 326).

Some embodiments of machine learning models as known in the art include variable governing parameters which are optimized during training to better simulate (or approximate in a particular simulation) observed real-life results corresponding to an input dataset, such as observed impacts on a book binding operation of selected intervention events (e.g., shut down, selective removal of one or more book elements, resequencing of book elements in a respective assembly channel). Such parameters may initially be set (e.g., user-specified) before training. Tuning of the hyperparameters, or in other words optimizing the values therefor, follows during training to obtain a set of values for the parameters corresponding to an accurate input-output mapping of the neural network for the training dataset. In various embodiments, tuning of parameters may be performed automatically during or between training iterations, manually based on user selection via a system interface, or combinations thereof. In some embodiments the parameters are not initially user-specified but instead predetermined formulaically or otherwise according to a "best guess" distribution of possible simulation parameters, and in some embodiments may initially be unknown and merely derived during training. The parameters may for example determine aspects of the neural network structure and/or training parameters, such as the number of hidden neuron layers, number and/or definition of training steps, learning rates, batch size, and the like.

During training of the neural network, parameters for the neural network may accordingly be varied in order for the neural network career outputs to sufficiently align with desired measures for the known dataset, and preferably optimized to minimize cross-validation losses. User input may be utilized for parameter optimization, for example to satisfy a desired learning rate and corresponding convergence characteristics to reduce the amount of input data points required in an exemplary assessment of intervention event impacts, even possibly at the expense of overall accuracy.

A model may in some embodiments be considered to be sufficiently trained when predictions best correlate, or at least sufficiently correlate to the satisfaction of the model designer or equivalent user, to what is actually observed in response to respective input datasets, or in other words when predicted mismatches and effects of corresponding intervention events best correlate with actual results therefrom.

As noted above, the dynamic rejection system 100 may be configured to review the trajectory of mismatch differentials (step 316), analyze possible intervention events, and determine if correction is warranted (step 318). Specifically, the dynamic rejection system 100, via the associated online sensors 140, 142, 144 and/or other data collectors, may detect process elements associated with the book block assembly line 120 and the case cover assembly line 130. Through a comparison of at least process elements related to the book block assembly line 120 and process elements related to the case cover assembly line 130, the dynamic rejection system 100 may predict when a mismatched pair will be fed into the book binding machine 110. A "mismatched pair" may include a book block and case cover that do not correspond with one another. The dynamic rejection system 100 may use the predicted mismatch data to predict mismatch differentials and determine if an intervention event is present.

As used herein, the term "mismatch differential" may refer to sequentially linked mismatched pairs. For example, the book block assembly line 120 may include book blocks 122A, 122A, 122A, 122B, 122B, and 122B and the case cover assembly line 130 may include case covers 132A, 132B, 132B, 132B, 132B, and 132B. Book block 122A may correspond to case cover 132A and book block 122B may correspond to case cover 132B. The mismatch differential for this exemplary scenario may be two (2), given that the second and third pairs are considered mismatched pairs.

To determine if an intervention event is present, predicted mismatch differentials may be compared to a mismatch differential threshold value. In certain optional embodiments, the mismatch differential threshold value may be a static number predetermined by a human operator. For example, a human operator may, via the user computing device 240, select a mismatch differential threshold value for the dynamic rejection system 100.

If the dynamic rejection system 100 determines the predicted mismatch differential is less than the mismatch differential threshold value, the dynamic rejection system 100 may determine whether an intervention event is warranted and/or may effectively resolve the mismatch. In some embodiments and dependent on the context, the dynamic rejection system 100 may resolve the mismatch via an automated intervention wherein, via process actuators, mismatched materials (e.g., book blocks, case covers, etc.) are temporarily removed from and subsequently reinstated along the respective book block assembly line 120 and/or case cover assembly line 130 (step 330), via for example a correction channel corresponding to the respective book block assembly line 120 and/or case cover assembly line 130 and enabling a removed book element (e.g., book block 122*x*) to be aside from the assembly channel but readily available for reinsertion and aligning with a matching book element (e.g., case cover 132*x*). As another example, the dynamic rejection system 100 may resolve the mismatch via an automated intervention wherein, via process actuators, mismatched materials (e.g., book blocks, case covers, etc.) are wholly ejected from the respective book block assembly line 120 and/or case cover assembly line 130 (step 332). Additional or alternative intervention events may include an automated shutdown of the assembly channels and the book binding operation more generally (step 334), if for example the shutdown is determined to be less impactful than resequencing or ejection of mismatched materials or such alternative interventions will not adequately allow for substantially continuous operation, or an automated alert to an operator of the binding operation for manual confirmation and/or correction as needed.

The determined intervention event in a given context may depend at least in part on a defined mismatch differential threshold. For example, a human operator may select as the threshold a mismatch differential value of four (4). The book block assembly line 120 may include book blocks 122A, 122A, 122A, 122B, 122B, and 122B and the case cover assembly line 130 may include case covers 132A, 132B, 132B, 132B, 132B, and 132B. Book block 122A may correspond to case cover 132A and book block 122B may correspond to case cover 132B. The mismatch differential in this example is two (2), and thus the dynamic rejection system 100 may determine there is an intervention event and resolve the issue by removing the second and third book blocks from the book block assembly line 120. Thus, the book binding machine 110 will receive matching pairs A-A, B-B, B-B, and B-B.

As another example, with the threshold for the mismatch differential value still being four (4), the book block assembly line 120 may include book blocks 122A, 122A, 122A, 122B, 122B, and 122B and the case cover assembly line 130 may include case covers 132A, 132A, 132B, 132B, 132B, and 132A. The mismatch differential in this example is three (3), thus allowing for automated intervention, and the dynamic rejection system 100 may determine there is an intervention event and preferably resolve the issue by diverting the third book block 122A from the book block assembly line 120 into the correction channel, and subsequently reintroducing the to correspond with the sixth case cover 132A, wherein all six pairs of book blocks and case covers are now matching. While this example refers to the "first" book element in each described sequence being first in line along the respective assembly channel in the operating direction, one of skill in the art may readily appreciate how the intervention event would be implemented in the opposite context wherein the "sixth" book element in each described sequence is first in line in the operating direction.

In an embodiment, if the dynamic rejection system 100 determines the predicted mismatch differential is greater than or equal to the mismatch differential threshold value, the dynamic rejection system 100 may determine a different type of intervention event is required and shut down the book production line such that the book binding machine 110 does not receive materials from the book block assembly line 120 or the case cover assembly line 130. For example, a human operator may select a mismatch differential value of two (2). The book block assembly line 120 may include book blocks 122A, 122A, 122A, 122B, 122B, and 122B and the case cover assembly line 130 may include case covers 132A, 132B, 132B, 132B, 132B, and 132B. Book block 122A may correspond to case cover 132A and book block 122B may correspond to case cover 132B. The detected mismatch differential is two (2), and thus the dynamic rejection system 100 may detect the intervention event and resolve the issue by shutting down the book production line 110.

In various embodiments, the dynamic rejection system 100 may output an alert when the dynamic rejection system 100 determines an intervention event but is not authorized for automated corrective response, to inform an operation when the dynamic rejection system 100 automatically resolves an issue, or the like. For example, the dynamic rejection system 100 may transmit the alert via a communications network to the user computing device 240 associated with the dynamic rejection system 100, or to any other device associated with the dynamic rejection system 100.

In some embodiments, the threshold itself may be determined automatically and dynamically by reference to one or more models as described above, for example in the context of identifying whether shutdown is required to minimize the overall impact of the required intervention. Alternatively, no threshold may be utilized at all, wherein for example the models are effective to determine the relative impacts of various intervention events without binary reference to a threshold value.

For example, a mismatch detection threshold value may be dynamic in nature such that the dynamic rejection system 100 may analyze the book block and case cover pairs being fed into the book binding machine 110 and determine a mismatch detection threshold value based on a neural network model. If the dynamic rejection system 100 predicts a mismatched pair, the dynamic rejection system 100 may then predict an issue length. The predicted issue length may be associated with how many mismatched pairs are sequentially linked together. Thus, if the dynamic rejection system 100 predicts a mismatched pair and is unclear as to the mismatch length, the dynamic rejection system 100 may assign a relatively low mismatch detection threshold value. If the dynamic rejection system 100 predicts a mismatched pair and is relatively confident that the mismatch length is relatively short (e.g., the mismatches are transient), the dynamic rejection system 100 may assign a relatively high mismatch detection threshold value.

Generally stated, the process elements and/or predicted mismatch differentials that may be determined by the dynamic rejection system 100 as disclosed herein may include characteristics of the dynamic rejection system 100 that are not directly monitored in real time but are indirectly determinable using machine learning with respect to other process variables. As previously noted, machine learning techniques may be implemented to further develop models associated with the dynamic rejection system 100 over time based on the information gathered in subsequent iterations, for example recent matching outcomes and recent mismatching outcomes. With each new input data set and corresponding quality metrics, further in view of any number of relevant associated conditions or parameters, the models may be continuously developed, modified, or confirmed for use in subsequent iterations.

Thus, one exemplary benefit of the dynamic rejection system 100 may be that the dynamic rejection system 100 optimizes or otherwise enables substantially continuous operation of the book production line in use cases wherein mismatches are present. The dynamic rejection system 100 may simply remove (or divert and reinstate) individual book elements where only slight deviations/issues are found and allow the book production line to continue to operate with minimal (if any) downtime. Thus, the dynamic rejection system 100 may provide efficiency to the book production line. Furthermore, the dynamic rejection system 100 may shut down the book production line when substantial issues are found, thus preventing unnecessary scrap from mismatched books.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method for automatically correcting book portion mismatches in a book binding operation, the method comprising:

receiving input signals from one or more online sensors corresponding to a sequence of first book portions being conveyed along a first assembly channel leading into a book binding stage and corresponding to a sequence of second book portions being conveyed along a second assembly channel leading into the book binding stage;

predicting a mismatch state between a first book portion and a second book portion based on the respective sequences and with respect to expected first and second sequences dependent on a defined book assembly batch;

determining an intervention event corresponding to the predicted mismatch state, from among a plurality of intervention events each respectively corresponding to one or more of a plurality of mismatch states; and automatically executing the determined intervention event corresponding to the predicted mismatch state;

at least one of the plurality of intervention events comprising a selective routing of the first book portion and/or the second book portion associated with the predicted mismatch state from the respective assembly channel into a correction channel and reinsertion of the first book portion and/or the second book portion associated with the predicted mismatch state into the respective assembly channel corresponding to a modified version of the respective sequence, wherein the method further comprises:

a model development stage comprising, for each of a plurality of input data sets received over time and comprising inputs from the one or more online sensors, correlating the input data sets, and any predicted mismatches and/or performed intervention events, with determined outcomes at a corresponding book binding stage; and for a current book binding operation, predicting the mismatch state between the first book portion and the second book portion, and further determining the intervention event corresponding to the predicted mismatch state, based on the associated inputs from the one or more online sensors and by reference to correlated data sets from the model development stage.

2. The method of claim 1, further comprising:

receiving, as part of the respective input data sets for the model development stage and for the current book binding operation, one or more input signals from at least one further sensor corresponding to matched first and second book portions at an end of the first and second assembly channels and leading into the book binding stage;

wherein a further intervention event, or lack thereof, is performed based on confirmation or a determined mismatch of the matched first and second book portions via the input signals from the at least one further sensor.

3. The method of claim 2, wherein the further intervention event, or lack thereof, is performed based on the confirmation or the determined mismatch of the matched first and second book portions via the input signals from the at least one further sensor is provided as a determined outcome with respect to the model development stage.

4. The method of claim 1, wherein the determined outcomes at least with respect to any predicted mismatch state comprise a determined productivity impact of a corresponding intervention event.

5. The method of claim 1, wherein the predicted mismatch state comprises a predicted mismatch differential, and the method comprises determining an intervention event or lack thereof based at least in part on a comparison of the predicted mismatch differential to a threshold value.

6. The method of claim 5, wherein the threshold value is determined at least in part by reference to correlated data sets from the model.

7. A system for automatically correcting book portion mismatches in a book binding operation, the system comprising:

one or more online sensors configured to generate output signals corresponding to a sequence of first book portions being conveyed along a first assembly channel leading into a book binding stage, and corresponding to a sequence of second book portions being conveyed along a second assembly channel leading into the book binding stage; and a controller functionally linked to the one or more online sensors and configured to:

predict a mismatch state between a first book portion and a second book portion based on the respective sequences and with respect to expected first and second sequences dependent on a defined book assembly batch;

determine an intervention event corresponding to the predicted mismatch state, from among a plurality of intervention events each respectively corresponding to one or more of a plurality of mismatch states; and automatically execute the determined intervention event corresponding to the predicted mismatch state;

at least one of the plurality of intervention events comprising generating control signals for selective routing of the first book portion and/or the second book portion associated with the predicted mismatch state from the respective assembly channel into a correction channel and reinsertion of the first book portion and/or the second book portion associated with the predicted mismatch state into the respective assembly channel corresponding to a modified version of the respective sequence, wherein the controller and/or one or more processors independent of the controller are configured during a model development stage, for each of a plurality of input data sets received over time and comprising inputs from the one or more online sensors, to correlate the input data sets, and any predicted mismatches and/or performed intervention events, with determined outcomes at a corresponding book binding stage;

wherein a model corresponding to the model development stage is stored in data storage functionally linked to the controller; and wherein the controller is configured, for a current book binding operation, to predict the mismatch state between the first book portion and the second book portion, and further determine the intervention event corresponding to the predicted mismatch state, based on the associated inputs from the one or more online sensors and by reference to correlated data sets from the model.

8. The system of claim 7, further comprising:

at least one further sensor configured to generate output signals, as part of the respective input data sets for the model development stage and for the current book binding operation, corresponding to matched first and second book portions at an end of the first and second assembly channels and leading into the book binding stage;

wherein a further intervention event, or lack thereof, is performed based on confirmation or a determined mismatch of the matched first and second book portions via the input signals from the at least one further sensor.

9. The system of claim 8, wherein the further intervention event, or lack thereof, as performed based on the confirmation or the determined mismatch of the matched first and second book portions via the input signals from the at least one further sensor is provided as a determined outcome with respect to the model development stage.

10. The system of claim 7, wherein the determined outcomes at least with respect to any predicted mismatch state comprise a determined productivity impact of a corresponding intervention event.

11. The system of claim 7, wherein the predicted mismatch state comprises a predicted mismatch differential, and the controller is configured to determine an intervention event or lack thereof based at least in part on a comparison of the predicted mismatch differential to a threshold value.

12. The system of claim 11, wherein the threshold value is determined at least in part by reference to correlated data sets from the model.

* * * * *